April 28, 1925.

J. BAUMANN

GRAVITY WHEEL

Filed Aug. 8, 1922

INVENTOR

Jules Baumann

April 28, 1925.
J. BAUMANN
GRAVITY WHEEL
Filed Aug. 8, 1922
1,535,090
3 Sheets-Sheet 3
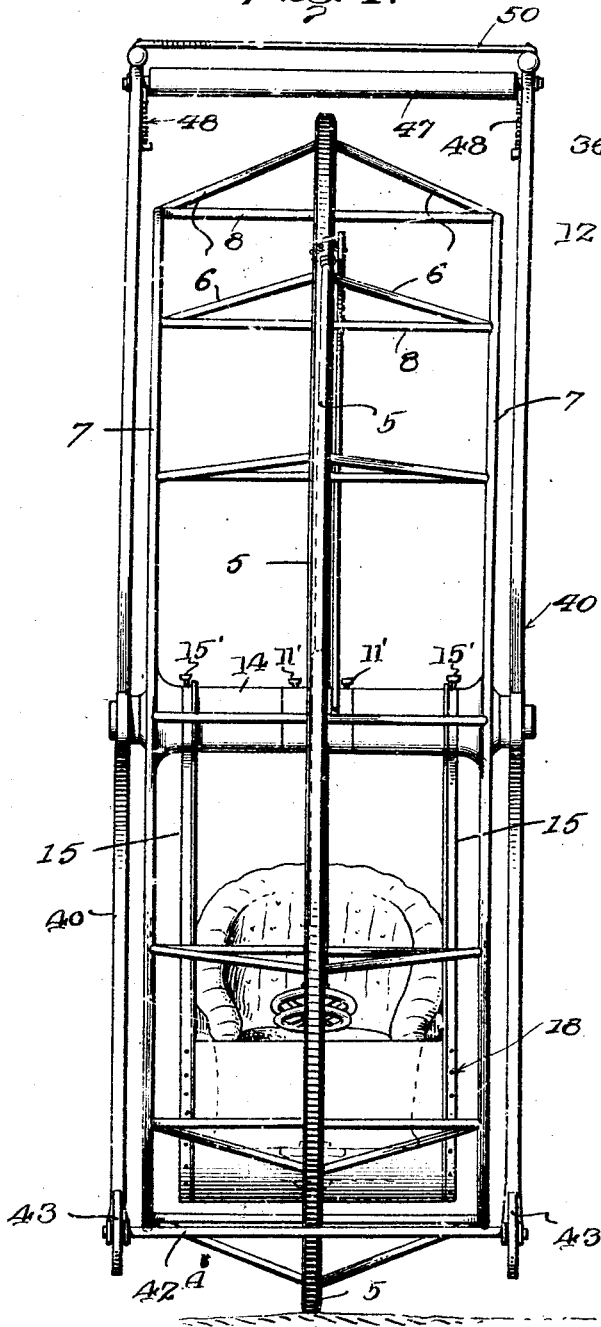
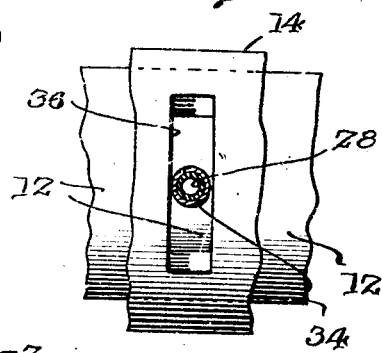
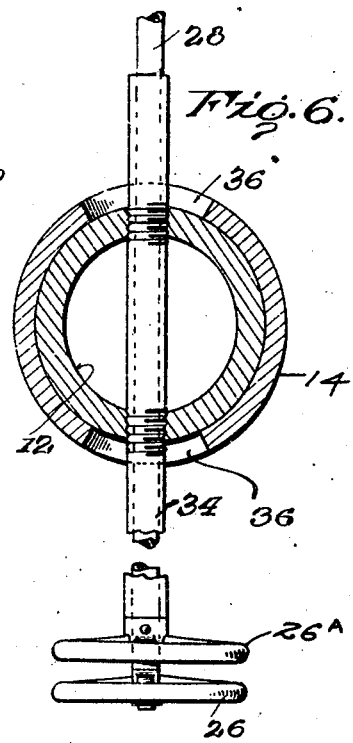
INVENTOR
Jules Baumann Patented Apr. 28, 1925.

1,535,090

UNITED STATES PATENT OFFICE.

JULES BAUMANN, OF HUMBOLDT, ARIZONA.

GRAVITY WHEEL.

Application filed August 8, 1922. Serial No. 580,429.

*To all whom it may concern:*

Be it known that I, JULES BAUMANN, a citizen of the United States, residing at Humboldt, in the county of Yavapai and State of Arizona, have invented Gravity Wheels, of which the following is a specification.

This invention relates to vehicles of the occupant propelled type.

An important object of this invention is to provide a vehicle which may be propelled and controlled by shifting the center of gravity.

A further object is to provide an occupant propelled vehicle having a single ground contact rim which is in the neighborhood of ten feet in diameter and therefore operates without subjecting the occupant to discomfort when the vehicle encounters an inequality in the line of travel.

Further, the invention aims to provide an occupant propelled vehicle having simple means whereby the vehicle may be steered, and stopped when desired.

A further object is to provide an occupant propelled vehicle which is of highly simplified construction, simple to operate, and cheap to manufacture.

Other objects and advantages of the invention will be apparent during the course of the following description.

In the accompanying drawing forming a part of this application and in which like numerals are employed to designate like parts throughout the same, Figure 1 is a perspective of the vehicle.

Figure 4 is an end elevation of the vehicle.

Figure 5 is a detail horizontal sectional view taken on line 5—5 of Figure 3.

Figure 6 is a detail sectional view taken on line 6—6 of Figure 3.

Figure 1:
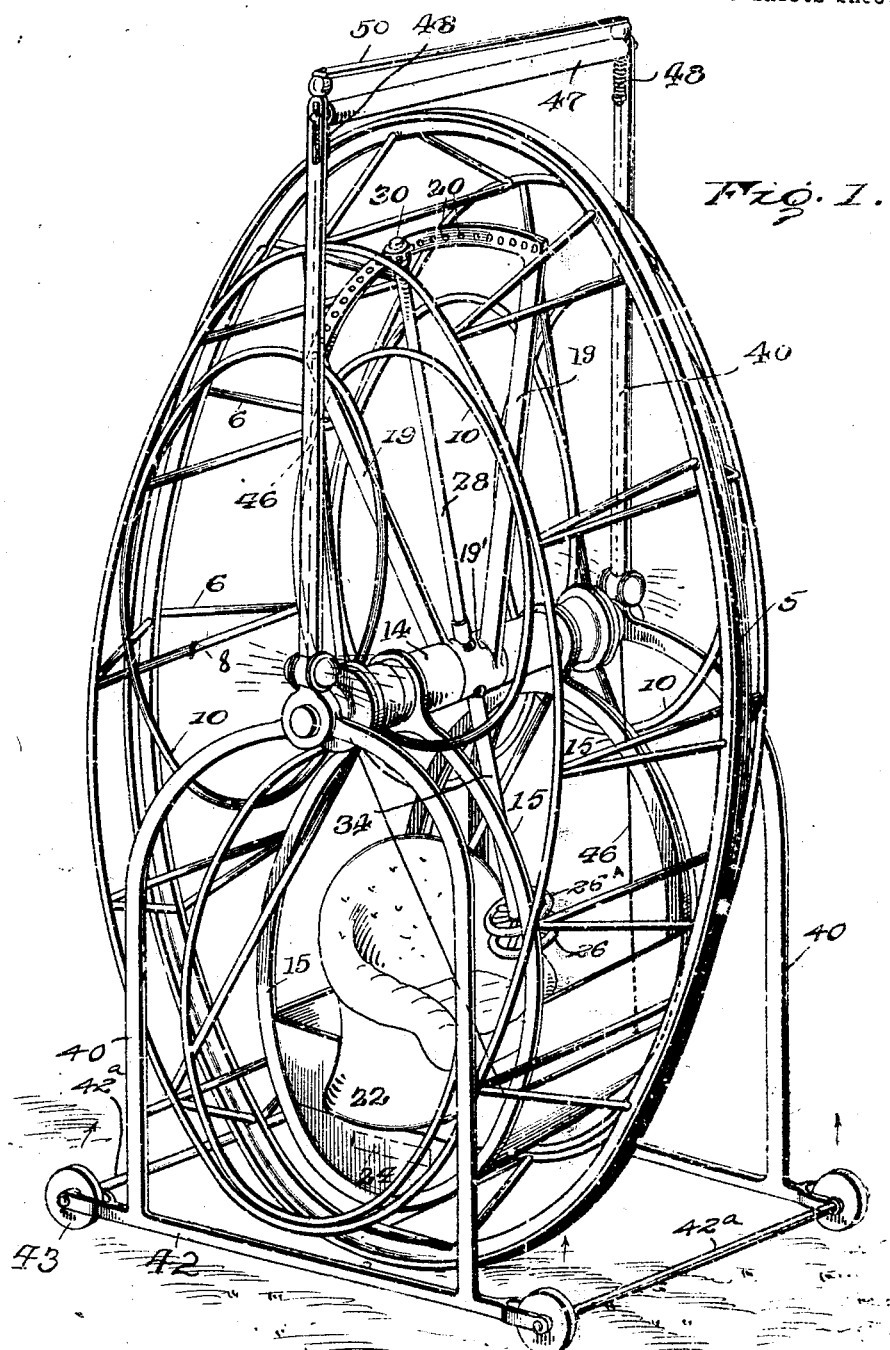

In the drawing wherein for the purpose of illustration is shown a preferred embodiment of the invention, the numeral 5 designates a ground contact rim having connection with a plurality of bracing rods 6; the said bracing rods having their outer ends connected to bracing annuli 7, of which there are two, one on each side. As illustrated in Figure 4, the bracing annuli 7 are joined by transversely extending rods 8, and are securely braced thereby. The ground contact 5, the annuli 7, and the bracing rods 6 and 8 define a frame which is rotatable.

Figure 3:
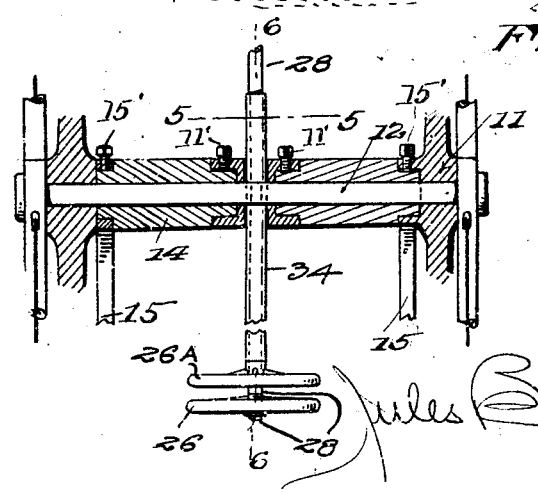
Figure 3 is a detail sectional view illustrating the axle, sleeve, and hub embodied in the invention.

The said frame further consists of two series of loops 10, arranged three on each side, lapping over each other and taking place of spokes of the annuli 7, and having their inner portions connected to a hub 11, Figure 3.

As illustrated in Figure 3, the hubs 11 rotatably receive an axle 12, in such a manner that an anti-friction connection is provided between the hubs 11 and the axle.

As further illustrated in Figure 3, a sleeve 14 consisting of three sections secured together by bolts 11' is rotatably mounted on the axle 12. Said sleeve 14 is rigidly connected to the curved side members 15 of the cradle, which is generically indicated by the numeral 18 as at 15'. The sleeve 14 also is rigidly connected to the diverging arms 19 of an arch 20 as at 19', so that it might be said that the arch and cradle form a single pivoted lever on the axle 12, one branch of which is arranged above the axle and the other branch being arranged below the axle. By shifting what is said to be the upper branch of the lever, the lower branch is also shifted, but in the opposite direction. Herein lies the theory of operation of this invention.

In operation, the arms 15 and 19 which are rigidly connected to the sleeve 14 are shifted about the axis of the axle, and therefore the cradle will be moved for shifting the center of gravity, and thereby setting the vehicle in motion, going forward if cradle is advanced and backward if cradle is retarded past center of gravity. After the vehicle is in motion gavity is relied on to continue the movement of the vehicle, by keeping cradle held in advanced or retarded position, this desired position of cradle being controlled by operator, as described later. It is evident that perfect control of speed or braking can be had by shifting weight forward or backward from center of gravity.

A swivel chair 22 is rotatably mounted in the bottom of the cradle and a suitable weight 24 is also arranged in the bottom of the cradle, under the chair and to move, or rotate, with it. When it is desired to change the direction of travel of the vehicle, the swivel chair 22 may be rotated for varying the balance of the vehicle.

The center of gravity may be shifted by means of a hand wheel 26 having connection with a shaft 28, the upper end of which is formed with a gear 30, which meshes with the arch 20. The gear 30 is formed with a series of fingers or pins arranged in an arcuate series of openings in the arch. When the shaft 28 is rotated by manipulation of the hand wheel 26, the gear 30 travels on the arch 20 and thereby operates what was said to be the upper branch of the lever. When the upper branch of the lever is thus operated, the cradle or the lower branch is also operated (in opposite direction) for shifting the center of gravity and setting the vehicle in motion.

The shaft 28 is rotatably extended through a tubular housing 34 which has threaded or other rigid connection with and through the inner axle 12. The tubular housing 34 is movable through arcuate slots 36, in the sleeve 14 so that when the shaft 28 and housing are operated about an axis passing through the axle 12, the outer axle 14 will not interfere.

Figure 2:
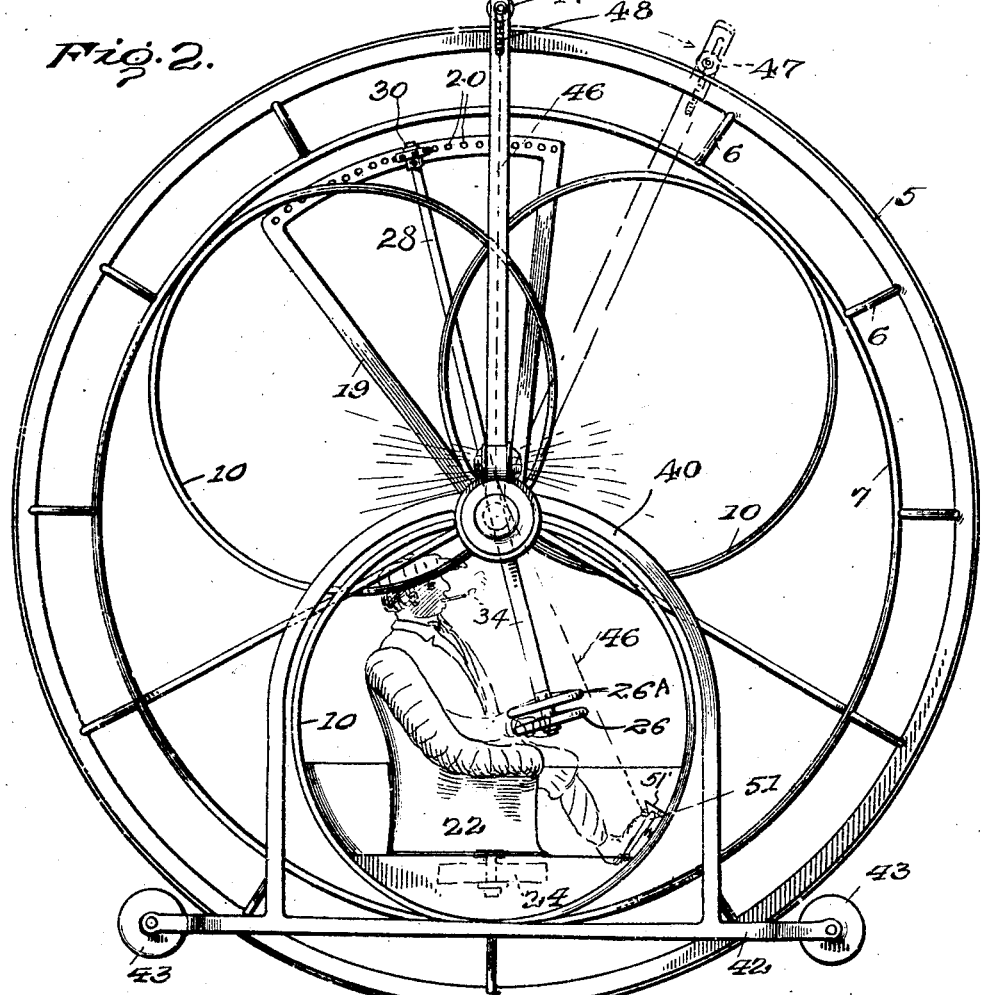
Figure 2 is a side elevation thereof.

A pair of braking frames generally designated by the numeral 40 are loosely mounted on the axle 12 at opposite sides of the vehicle and are in form of inverted Y's, the lower branches of the Y-shaped frames 40 having connection with longitudinally extending bars 42, which as illustrated in Figure 2 are provided at their ends with wheels 43. The wheels 43 which are arranged in advance of and rearwardly of the ground contact rim 5 are adapted to engage the ground, when tilted either forward or backward, as the vehicle stops so that the vehicle will not tip over on its side. This applies more particularly when the vehicle is not occupied, as when occupant is in the chair he has control of the balance of the vehicle by means of rotating said chair with weight attached to same. Braces 42^A are also provided in front and back of ground contact rim, Figure 1.

The upper portion of the Y-shaped frames are of tubular formation and receive cables 46 connected to a transversely extending braking roller 47, adapted for contacting with the rim and bringing the vehicle to a halt, or holding same in stationary position when occupant is out of vehicle. When not in use the braking roller 47 is urged to its elevated position by means of springs 48. The upper portions of the Y-shaped braking frames are also joined by a cross strip 50 in the manner illustrated in Figure 4.

Figure 2 illustrates that the flexible element 46 has connection with a brake pedal 51 by means of which the brake may be pedally applied, and held locked in the position desired by a pivoted hook member 51'. It is to be understood that while a hook 51' is shown for holding the pedal 51 in a locked position, that any means may be employed and that the means herewith shown is only disclosed for a matter of illustration.

When the braking roller 47 is applied it is swung to the dotted line position as illustrated in Figure 2 due to the rotation of the wheel in a clock-wise direction, or the reverse if wheel is going backward, when the roller and consequently the upper branches of the Y-shaped standards are thus moved, the foremost, or rear as case may be, wheels 43 will be engaged with the ground for bringing the vehicle to a halt in an upright position.

In operation, the operator seats himself in the seat 22 and rotates the hand wheel 26 for changing the center of gravity as previously outlined. When the vehicle is set in operation by changing the center of gravity it will continue its operation so long as the center of gravity is kept displaced.

The direction in which the ground rim revolves depends upon the position of the cradle, it being possible by advancing the position of said cradle with respect to the rim to cause said rim to move in a forward direction. In order to retard the forward movement of the rim, it will be necessary for the operator to move the cradle rearwardly. It will therefore be apparent that the wheel is controlled by the cradle and weight being moved to and from the center of gravity, balance being used for power and control, and the vehicle thus deriving its name of gravity wheel.

When it is desired to change the direction of travel of the vehicle or keep the vehicle from tipping, the operator grasps the hand wheel 26^A secured to the lower portion of tubular housing 34 (about 6 inches above hand wheel 26) and then turns his body so as to move seat 22 on its swivel, with weight attached to said seat.

I claim:—

1. A vehicle comprising a ground contact rim, an axle on which the ground contact rim turns, a sleeve receiving said axle, an occupant carrying cradle having rigid connection with and suspended from the sleeve, an arch extending upwardly from and rigidly connected to said sleeve, and a manually operable shaft extending through said axle and sleeve and having a gear engaged with said arch whereby to move the same and shift the center of gravity of said cradle.

2. A vehicle comprising a ground contact rim, an axle on which the ground contact rim turns, a sleeve receiving said axle, an occupant carrying cradle having rigid connection with and suspended from the sleeve, an arch extending upwardly from and rigidly connected to said sleeve, a manually operable shaft extending through said axle and sleeve and having a gear engaged with said arch whereby to move the same and shift the center of gravity of said cradle, and a tubular housing rigidly connected through said axle and rotatably receiving said shaft.

3. A vehicle comprising a ground contact rim, an axle on which the ground contact rim turns, a sleeve receiving said axle, an occupant carrying cradle having rigid connection with and suspended from the sleeve, an arch extending upwardly from and rigidly connected to said sleeve, a manually operable shaft extending through said axle and sleeve and having a gear engaged with said arch whereby to move the same and shift the center of gravity of said cradle, a tubular housing rigidly connected through said axle and rotatably receiving said shaft, and hand wheels attached to said housing and said shaft, the upper wheel fastened to said housing and the lower wheel fastened to said shaft.

4. A vehicle comprising a ground contact rim, an axle on which the ground contact rim turns, a sleeve receiving said axle, an occupant carrying cradle having rigid connection with and suspended from the sleeve, an arch extending upwardly from and rigidly connected to said sleeve, a manually operable shaft extending through said axle and sleeve and having a gear engaged with said arch whereby to move the same and shift the center of gravity of said cradle, a tubular housing rigidly connected through said axle and rotatably receiving said shaft, a swivelly mounted chair arranged in said cradle, and a weight attached under said chair to turn with the same.

5. A vehicle comprising a ground contact rim, an axle on which the ground contact rim turns, a sleeve receiving said axle, an occupant carrying cradle having rigid connection with and suspended from the sleeve, an arch extending upwardly from and rigidly connected to said sleeve, a manually operable shaft extending through said axle and sleeve and having a gear engaged with said arch whereby to move the same and shift the center of gravity of said cradle, a tubular housing extending through said axle and sleeve and rotatably receiving said shaft, a hand wheel connected to said shaft and arranged within convenient reach of the operator, a hand wheel connected to said housing, braking frames arranged at opposite sides of said rim, and a braking roller slidably carried by said frames.

6. A vehicle comprising a ground contact rim, an axle on which the ground contact rim turns, a sleeve receiving said axle, an occupant carrying cradle having rigid connection with and suspended from the sleeve, an arch extending upwardly from and rigidly connected to said sleeve, a manually operable shaft extending through said axle and sleeve and having a gear engaged with said arch whereby to move the same and shift the center of gravity of said cradle, a tubular housing extending through said axle and sleeve and rotatably receiving said shaft, a hand wheel connected to said shaft and arranged within convenient reach of the operator, a hand wheel connected to said housing, braking frames arranged at opposite sides of said rim, a braking roller slidably carried by said frames, a pedal having connection with said roller, and means engaging said pedal for holding said braking roller in contact with said rim.

7. A vehicle comprising a ground contact rim, an axle on which the ground contact rim turns, a sleeve receiving said axle, an occupant carrying cradle having rigid connection with and suspended from the sleeve, an arch extending upwardly from and rigidly connected to said sleeve, a manually operable shaft extending through said axle and sleeve and having a gear engaged with said arch whereby to move the same and shift the center of gravity of said cradle, a tubular housing extending through said axle and sleeve and rotatably receiving said shaft, a hand wheel connected to said shaft and arranged within convenient reach of the operator, a hand wheel connected to said housing, braking frames arranged at opposite sides of said rim, a braking roller slidably carried by said frames, and ground contact wheels carried by said frames normally spaced from engagement with the ground.

In testimony whereof, I have affixed my signature in the presence of two witnesses.

JULES BAUMANN.

Witnesses:
G. E. MEANY,
W. A. SNYDER.